United States Patent [19]

Börner

[11] 3,760,471

[45] Sept. 25, 1973

[54] METHOD OF MAKING AN ELECTROMECHANICAL FILTER

[76] Inventor: Manfred Börner, Sylvanerweg 4, 79 Ulm, Germany

[22] Filed: Oct. 26, 1971

[21] Appl. No.: 192,330

Related U.S. Application Data

[63] Continuation of Ser. No. 754,583, Aug. 22, 1968, abandoned.

[30] Foreign Application Priority Data

Aug. 26, 1967 Germany .................. P 15 66 009.0

[52] U.S. Cl. .................... 29/25.35, 117/38, 310/8.2, 310/9.5, 333/72

[51] Int. Cl. .......................... B01j 17/00, H04r 17/00

[58] Field of Search .................. 29/25.35, 624–630; 117/38; 310/8.2, 9.5; 333/72

[56] References Cited

UNITED STATES PATENTS

| | | | |
|---|---|---|---|
| 3,363,119 | 1/1968 | Koneval et al. | 310/9.5 |
| 3,487,318 | 12/1969 | Herman | 332/72 X |
| 3,384,768 | 5/1968 | Shockley et al. | 310/9.5 |
| 2,765,765 | 10/1956 | Bigler et al. | 29/25.35 X |

*Primary Examiner*—Richard J. Herbst
*Assistant Examiner*—Carl E. Hall
*Attorney*—Spencer & Kaye

[57] ABSTRACT

A method of making an electromechanical filter of the type having a plate-shaped crystal and a plurality of metal coatings arranged on portions of the major surfaces of the crystal. The metal coatings are produced by applying first layers of metal, having accurately determined boundaries, to the major surfaces of the crystal and then applying additional overlays of metal to the surface or surfaces of the first layers in such quantity that the resonant frequency of the filter will equal a desired frequency.

7 Claims, 3 Drawing Figures

PATENTED SEP 25 1973 3,760,471

Inventor:
Manfred Börner
By: Spencer & Kaye
Attorneys

METHOD OF MAKING AN ELECTROMECHANICAL FILTER

CROSS REFERENCE TO RELATED APPLICATION

This application is a continuation of applicant's copending U. S. Pat. application Ser. No. 754,583, filed Aug. 22, 1968, and now abandoned.

BACKGROUND OF THE INVENTION

The present invention relates to a process of manufacturing an electromechanical frequency filter comprising a plate-shaped crystal, such as the crystal of quartz, in which are formed a plurality of resonators. These resonator regions of the crystal which, in turn, are defined and formed by metal coatings arranged on the major crystal surfaces, are connected with each other by crystaline regions which act as coupling elements. The lateral dimensions of the metal coatings as well as the ratio of the thickness of the regions which act as coupling elements to the thickness of the resonator regions provided with the metal coatings determine the bandwidth of the frequency filter while the quantity of metal in the metal coatings determines the resonant frequency of the resonators.

It is known in the art to produce an electromechanical frequency filter from a plate-shaped crystal by making grooves or cuts between the individual resonators, using mechanical cutting operations such as milling or sawing, to generate the coupling elements. The disadvantage of this method lies in the fact that these frequency filters are not mechanically very stable; they are easily broken by normal handling. This is due not only to the fact that the coupling webs of the completed structure are relatively narrow, but also to the fact that the mechanical vibrations generated by the mechanical groove cutting machines produce cracks in the body of the crystal which can later cause the entire device to break.

In addition to this disadvantage, it is difficult, with this prior art method of producing an electromechanical frequency filter, to provide the resonator regions of the crystal with the necessary high dimensional accuracy.

It has also been suggested that electromechanical frequency filters be produced from a plate-shaped crystal by providing variations in the cross-sectional thickness thereof to form the regions which serve as resonators and the regions which serve as the coupling elements. According to one suggestion, the different thicknesses are effected by direct removal of the crystaline material. According to a second suggestion, the thickness of the resonator region is increased with respect to the regions which serve as coupling elements by evaporating onto the crystal a plurality of metal layers.

Whereas the required dimensions of the resonator regions can be obtained with high accuracy with filters produced according to the first technique, for example, by means of etching, it is difficult to equalize the frequencies of the individual resonators.

The second evaporation technique of producing frequency filters has the disadvantage that the lateral dimensions of the resonators can not be determined with sufficient accuracy since the metal which is being evaporated is scattered at the edges of the evaporation mask and since the masks are easily contaminated during the course of the process. As a result, large variations occur in the frequency characteristics of subsequently manufactured frequency filters.

On the other hand, it is a simple matter, with the second technique of varying the cross-sectional thickness of the crystal plate, to tune the individual resonators to the desired frequency since the quantity of evaporated metal can be accurately controlled.

SUMMARY OF THE INVENTION

It is, therefore, an object of the present invention to find an improved method for producing electromechanical frequency filters.

This object, as well as other objects which will become apparent in the discussion that follows, is achieved according to the present invention, by increasing the cross-sectional thickness of the resonator regions of a plate-shaped crystal in two steps: first, by applying first layers of metal having accurately determined lateral boundries to the major surfaces of the crystal, and second, by applying additional overlays of metal to the surfaces of the first layers in such quantity that the resonant frequency of the resonator regions will equal the desired frequency.

The metal coatings obtained in this way will have accurately determined lateral boundries in the immediate vicinity of the crystal as well as accurately determined total masses which impart the desired frequency to each of the resonators. As a consequence, the frequency filter produced according to the method of the present invention, will have an accurately determined frequency response.

According to one preferred embodiment of the present invention, the step of applying the first layer of metal includes the successive steps of:

1. covering at least one of the major surfaces of a plate-shaped crystal, which has been produced with the requisite accuracy, with a metal layer;
2. coating this metal layer with a light sensitive photo-resist layer;
3. exposing the photo-resist layer to light through a photo mask;
4. etching away the photo-resist layer and the metal layer at certain points on the crystal; and
5. removing the remainder of the photo-resist layer.

According to a second preferred embodiment of the present invention, the step of applying the additional overlay of metal to the first layer includes the steps of evaporating metal through a mask onto the first layer while determining the resonant frequency of the resonator regions and terminating the evaporation process when the desired resonant frequency is reached. The evaporation of this additional overlay can be accomplished through a mask so that the accurately determined edges of the first layer will remain the lateral boundries of the metal coatings.

DESCRIPTION OF THE PREFERRED EMBODIMENTS

Figure 1:
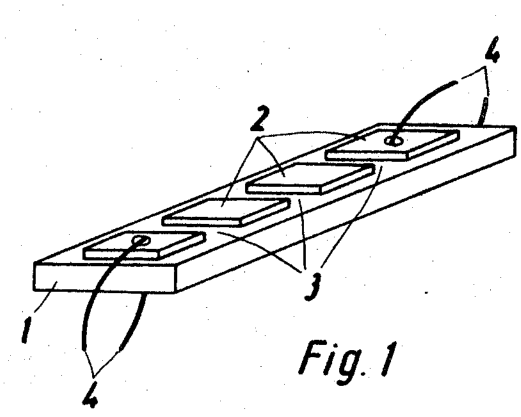
FIG. 1 is a perspective view of an electromechanical frequency filter which has been produced according to the method of the present invention.
Figure 2:
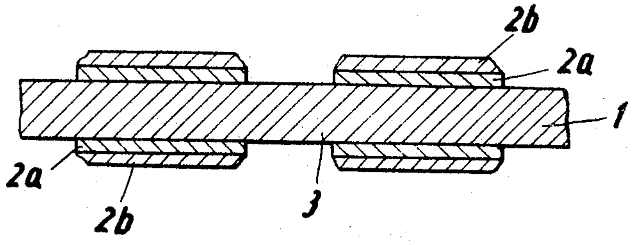
FIG. 2 is a cross-sectional view of a portion of the frequency filter of FIG. 1.
Figure 3:
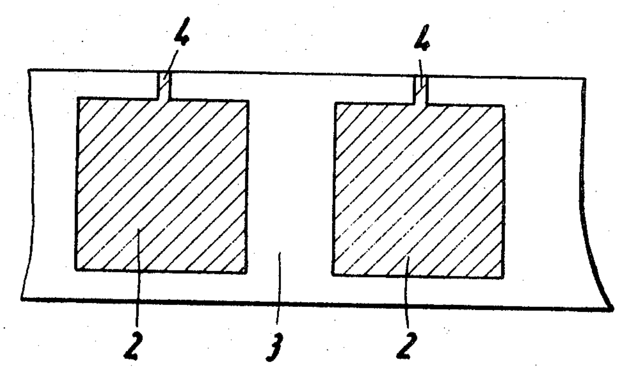
FIG. 3 is a top view of a portion of the frequency filter of FIG. 1.

The preferred embodiments of the individual steps of the method which forms the present invention will now be described in detail. Reference is made to FIGS. 1, 2 and 3 which show various views of the electromechanical filter produced by the method according to the present invention. Identical elements shown in the individual figures are provided with the same reference numerals.

FIG. 1 illustrates an electromechanical frequency filter produced by the method according to the present invention. FIGS. 2 and 3 illustrate, in cross section and top view, respectively, a portion of the filter of FIG. 1.

As may be seen in FIG. 1, the frequency filter comprises a plate-shaped crystal 1, which, for example, may be quartz, portions of the two main surfaces of which are provided with metal coatings 2. The crystaline regions beneath these portions of the main surfaces which are provided with the coatings 2 serve as the resonators of the frequency filter. These resonator regions are joined together by intermediate crystaline regions 3 which serve as coupling elements for the frequency filter. If the metal coatings 2 are electrically connected with terminal wires 4 these resonator regions can simultaneously serve as electromechanical transducers.

The formation of the metal coatings 2, according to the present invention, over the crystaline regions which serve as resonators may be clearly seen in FIG. 2. The metal coatings 2 are constructed of two parts **2*a* and 2*b*; a first metal layer 2*a* is applied directly to the surface of the crystal 1 while a second overlay 2*b* is located on the first layer 2a. The crystaline region illustrated in FIG. 2 which lies between the two resonator regions that are covered with the metal coatings serve as a coupling element 3.**

According to a preferred embodiment of the present invention the frequency filter is manufactured in the following manner. The plate-shaped crystal is produced first. It is constructed with the desired dimensions and provided with the necessary grade of surface. Care is taken to orient the edges of the crystal in the necessary way with respect to the crystaline structure, depending upon the type of crystal which is used. One or both sides of the plate-shaped crystal are subsequently entirely coated with a layer of metal. The application of the metal layer is preferably accomplished by electroplating or by evaporation in a vacuum. This metal layer is then provided with a light sensitive photo-resist layer which is subsequently exposed at selected portions by passing light through a mask. The shape of the mask will determine the exact lateral dimensions of the metal coatings 2 which, in turn, will define the crystaline regions which serve as resonators.

In the next step of manufacture,portions of the metal layer are removed by etching, leaving the individual layers **2*a* on the crystal plate 1. The remainder of the photo-resist layer is then also removed. The height of the metal layers 2*a***, which are located above those regions of the crystal which are to serve as resonators, is made slightly less than the height which is ultimately required.

Because of the manner in which they are produced, the metal layers **2*a* are formed with sharply defined boundaries, the dimensions of which are determined with exceedingly high accuracy. As has been mentioned above in the "Background of the Invention", the bandwidth which will be exhibited by the finished frequency filter is largely determined by the lateral dimensions of the resonators and the coupling elements; that is, the lateral dimensions of the metal layers 2*a***.

In a final step in the manufacture of the frequency filter, the quantity of metal in the metal coatings 2 is brought to the required value by evaporating additional metal overlays **2*b* onto the layers 2*a*. Since the lateral dimensions of the resonators and the coupling elements are already determined by the shape of the metal layers 2*a*, it is no longer required that the contours of the additional metal overlays 2*b* be determined with high accuracy. The overlays 2*b* can, therefore, be simply evaporated through a mask onto the layers 2*a*** in the usual manner.

The final tuning of the resonant frequency of the resonators is effected during this evaporation of the overlays **2*b***. This tuning can be accomplished by evaporating metal onto one resonator at a time while continuously monitoring the resonant frequency of this resonator via contacts applied to its metal coatings. During this process the metal coatings of its adjoining resonators should be short-circuited by an electrical connection.

For example the device used to monitor the resonant frequencies may be constructed in the manner taught in 1924 by G.W. Pierce, wherein a crystal is connected to form the tank circuit of an oscillator.

If for example, an eight resonator crystal filter for a frequency of 10.7 mc/sec according to the invention is to be constructed, it is advantageous to use a quartz crystal plate having a length of 25 mm, a width of 12 mm and a thickness of about 0.15 mm. The sixteen first layers **2*a*, on eight each of the main surfaces, each cover an area of 3 by 2.15 mm and have a thickness of about five microns. The first layers are spaced from one another by a distance of about 0.1 mm and consist of gold. To get the desired frequency of 10.7 mc/sec, one had to deposit by an evaporation process an overlay 2*b*** of gold onto the first layer having an average thickness of about 1 micron.

In order to most easily carry out the tuning and balancing of the individual resonators, it is advantageous, according to a particular modification of the present invention, to provide the metal layers **2*a* with webs or strips 4, as shown in FIG. 3, which serve as electrodes. These strips 4 can be simply produced by properly photo masking and etching the metal layers 2*a*. The thickness of the strips 4 need not be increased during the metal evaporation of the additional overlays 2*b***.

In comparison with the prior art method of making frequency filters by producing the differences in the cross-sectional thickness of a crystal in a single evaporation process, the application of the first metal layers **2*a* by means of electrolytic deposition, according to the preferred embodiment of the present invention, offers an additional advantage. Strong ageing effects may be observed with evaporated metal layers as a result of their amorphous structure. If, in the frequency filter manufactured according to the present invention, the first metal layers 2*a* are applied electrolytically to a height which is already substantially equal to the desired height of the final metal coatings, the influence of these ageing effects will be sharply reduced since only a small amount of additional evaporated metal will be required for the overlays 2*b***.

It is possible, according to the present invention, to also deposit the first metal layers 2*a* on the crystal by evaporation; if this is done, it is practical to artifically age these layers 2*a* by annealing prior to the evaporation of the overlays 2*b*.

In special cases, particularly where the requirements for accuracy in the frequency filter to be produced are not too high, it can be practical to apply the additional metal overlays 2*b* in the form of spots or blobs of metal which only partially cover the first metal layers 2*a*. This technique permits a reduction in the cost of manufacture and, perhaps even more significant, makes possible the influence of the harmonic characteristics of the electromechanical filter by proper choice of the position of these spots of metal.

It will be understood that the above description of the present invention is susceptible to various modifications, changes and adaptations.

I claim:

1. In a method of making an electromechanical frequency filter comprising a plate-shaped crystal and a plurality of metal coatings arranged on portions of the two opposite major surfaces of said crystal, the regions of said crystal beneath said metal coatings forming the resonator zones and the intermediate regions of said crystal between said resonator zones forming the coupling elements of said filter, wherein the lateral dimensions of said metal coatings and the ratio of the thickness of said intermediate regions to the thickness of the resonator regions with said metal coatings determines the bandwidth of said filter and the quantity of metal in said metal coatings determines the resonant frequency of said resonator regions, the improvement wherein said metal coatings are formed by the steps of:

a. forming a first layer of metal, having accurately determined lateral boundaries, on a major surface of said crystal, utilizing a photomasking and etching technique, from a layer of metal applied to substantially the entire major surface of said crystal, and b. evaporating an additional overlay of metal to the surface of said first layer, and wholly within the confines thereof, through a mask having a shape such that after the evaporation the lateral edges of said first layer of metal in the immediate vicinity of said major surface of said crystal will be retained;

c. determing the resonant frequency of the associated resonator region during step (b); and d. terminating step (b) when the quantity of metal in said additional overlay is such that the resonant frequency of the associated resonator region is equal to a desired frequency, whereby each of said metal coatings has accurately determined lateral boundaries in the immediate vicinity of said crystal as well as a total mass which imparts said desired frequency to its associated resonator, in consequence of which the filter has an accurately determined frequency response.

2. The improvement defined in claim 1 wherein said crystal is quartz.

3. The improvement defined in claim 1 wherein said first layer of metal is electrolytically deposited onto said crystal.

4. The improvement defined in claim 1 to wherein said first layer of metal is evaporated onto said crystal.

5. The improvement defined in claim 4 wherein said first layer of metal is annealed before said additional overlay of metal is applied thereto.

6. The improvement defined in claim 1 wherein webs are applied to said metal coatings to form electrode terminals.

7. The improvement defined in claim 1 wherein the step of forming said first layer of metal includes the successive steps of:

1. covering with a metal layer at least one major surface of a crystal which has been produced with the requisite accuracy;
2. coating said metal layer with a light sensitive photo-resist layer;
3. exposing said photo-resist layer to light through a photomask;
4. etching away said photo-resist layer at certain areas on said crystal, as by the shape of said photomask, to uncover the underlying portions of said metal layer;
5. etching away the uncovered portions of said metal layer; and
6. removing the remainder of said photo-resist layer.

* * * * *

UNITED STATES PATENT OFFICE
CERTIFICATE OF CORRECTION

Patent No. 3,760,471 Dated September 25th, 1973

Inventor(s) Manfred Börner

It is certified that error appears in the above-identified patent and that said Letters Patent are hereby corrected as shown below:

In the heading of the patent, after line 4 insert
--[73] Assignee: Telefunken Patentverwertungsgesellschaft m.b.H., Ulm/Donau, Germany--.

Column 6,
line 19, after "1" delete "to".

Signed and sealed this 26th day of March 1974.

(SEAL)
Attest:

EDWARD M.FLETCHER,JR.
Attesting Officer

C. MARSHALL DANN
Commissioner of Patents

ORM PO-1050 (10-69)

USCOMM-DC 60376-P69
☆ U.S. GOVERNMENT PRINTING OFFICE : 1969 O—366-334.